US007243182B2

(12) United States Patent
Jensen et al.

(10) Patent No.: US 7,243,182 B2
(45) Date of Patent: Jul. 10, 2007

(54) CONFIGURABLE HIGH-SPEED SERIAL LINKS BETWEEN COMPONENTS OF A NETWORK DEVICE

(75) Inventors: Niels-Peder Mosegaard Jensen, Mountain View, CA (US); Nancy Shen, Irvine, CA (US); Joel Craig Naumann, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 10/986,100

(22) Filed: Nov. 10, 2004

(65) Prior Publication Data

US 2006/0075175 A1 Apr. 6, 2006

Related U.S. Application Data

(60) Provisional application No. 60/615,909, filed on Oct. 4, 2004.

(51) Int. Cl.
*G06F 13/00* (2006.01)
(52) U.S. Cl. ...................... 710/317; 710/305; 370/364; 370/402

(58) Field of Classification Search ................ 710/1, 710/52, 316; 370/258, 360, 404
See application file for complete search history.

(56) References Cited

U.S. PATENT DOCUMENTS

| 6,587,470 | B1* | 7/2003 | Elliot et al. ................. 370/404 |
| 6,760,793 | B2* | 7/2004 | Kelley et al. ................. 710/52 |
| 6,944,152 | B1* | 9/2005 | Heil ........................... 370/360 |
| 7,013,352 | B2* | 3/2006 | Garnett ......................... 710/1 |
| 7,035,228 | B2* | 4/2006 | Baumer ...................... 370/258 |

OTHER PUBLICATIONS

National Semiconductor, "DS90CP04 4×4 Low Power 2.5 Gb/s LVDS Digital Cross-Point Switch," Jan. 2004, copyright 2004 National Semiconductor Corporation, www.national.com.

* cited by examiner

*Primary Examiner*—Christopher E. Lee
(74) *Attorney, Agent, or Firm*—Charles E. Krueger

(57) ABSTRACT

A system for selectively forming high-speed serial connections between various components of a network device that includes a multiplexing switch coupled a GE slot and to the high speed serial interfaces of a PHY and at least two network devices. The switch can be programmed to connect the serial interfaces of the two network modules to provide a high-speed, low-latency serial link between the two network modules. Alternatively, the serial interface of a network module can be connected to the GE slot to provide a high-speed, low-latency serial link between the network module and the GE slot.

7 Claims, 4 Drawing Sheets

… (1)

CONFIGURABLE HIGH-SPEED SERIAL LINKS BETWEEN COMPONENTS OF A NETWORK DEVICE

RELATED APPLICATIONS

This application claims priority from a provisional application entitled A METHOD AND SYSTEM FOR CONFIGURING HIGH-SPEED SERIAL LINKS BETWEEN COMPONENTS OF A NETWORK DEVICE, filed Oct. 4, 2004, Ser. No. 60/615,909, which is hereby incorporated by reference for all purposes.

BACKGROUND OF THE INVENTION

Network devices, such as routers and switches, often utilize modules and cards to implement interfaces and ports to provide interconnectivity to other network devices and allow the network device to be configured to meet the particular requirements of a particular network node.

The network devices must provide a switching fabric to allow the transfer of data and other information between modules and cards. A common implementation of a switching fabric is a bus system, such as the PCI bus, where PCI bus defines an interface between a host CPU and a number of peripheral devices. The number of peripheral devices connected can be increased by utilizing PCI to PCI (P2P) bridges to couple PCI bus segments and extend the bus.

A single memory map applies to all the PCI bus segments so that a given memory address specifies a unique PCI bus segment and device on the segment. The PCI allows for bus masters so that, for examples, two network devices may communicate directly without CPU intervention. However, since the PCI bus system is hierarchical in the sense that communication between devices is managed by the P2P bridges and devices on different segments must be managed by multiple P2P bridges, there can be high latency when bus segments or busy and arbitration is complicated.

The CPU is the root device in the PCI hierarchy which is useful in network devices that use a centralized processing model where functions such as security processing is performed by the CPU for all network modules.

However, many network devices utilize a distributed processing model where processing is performed on the network modules without the use of the CPU to avoid latency due to the need to access the CPU and memory through multiple P2P bridges and bus segments.

The challenges in the field of switching fabrics continue to increase with demands for more and better techniques having greater flexibility and speed. Therefore, a need has arisen for a new system and method for coupling modules in a network device.

BRIEF SUMMARY OF THE INVENTION

In one embodiment of the invention, a network device includes a non-blocking switch that has data ports coupled to, respectively, the high-speed serial interface of a PHY, a Gigabit Ethernet (GE) slot, and the serial interfaces of first and second network modules. The 4×4 switch is programmable to connect any two data ports.

In another embodiment of the invention, the non-blocking switch is programmed to connect the serial interfaces of the network modules to provide a high-speed serial link between the first and second network modules for low-latency communication between the network modules.

In another embodiment of the invention, the non-blocking switch is programmed to connect the serial interface of a Network Module to the GE slot to provide a high-speed serial link between the first and second network modules for low-latency communication between the network module and the GE slot.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

The invention will now be described with reference to various embodiments implemented in a network device. In the following, the term network device is utilized broadly to include any component such as a router, bridge, switch, layer 2 or layer 3 switch, gateway, etc., that is utilized to implement connectivity within a network or between networks.

Further, in the following the term "Network Module" is utilized broadly to include any type of device that may be attached to a network device to perform network related functions.

Figure 1:
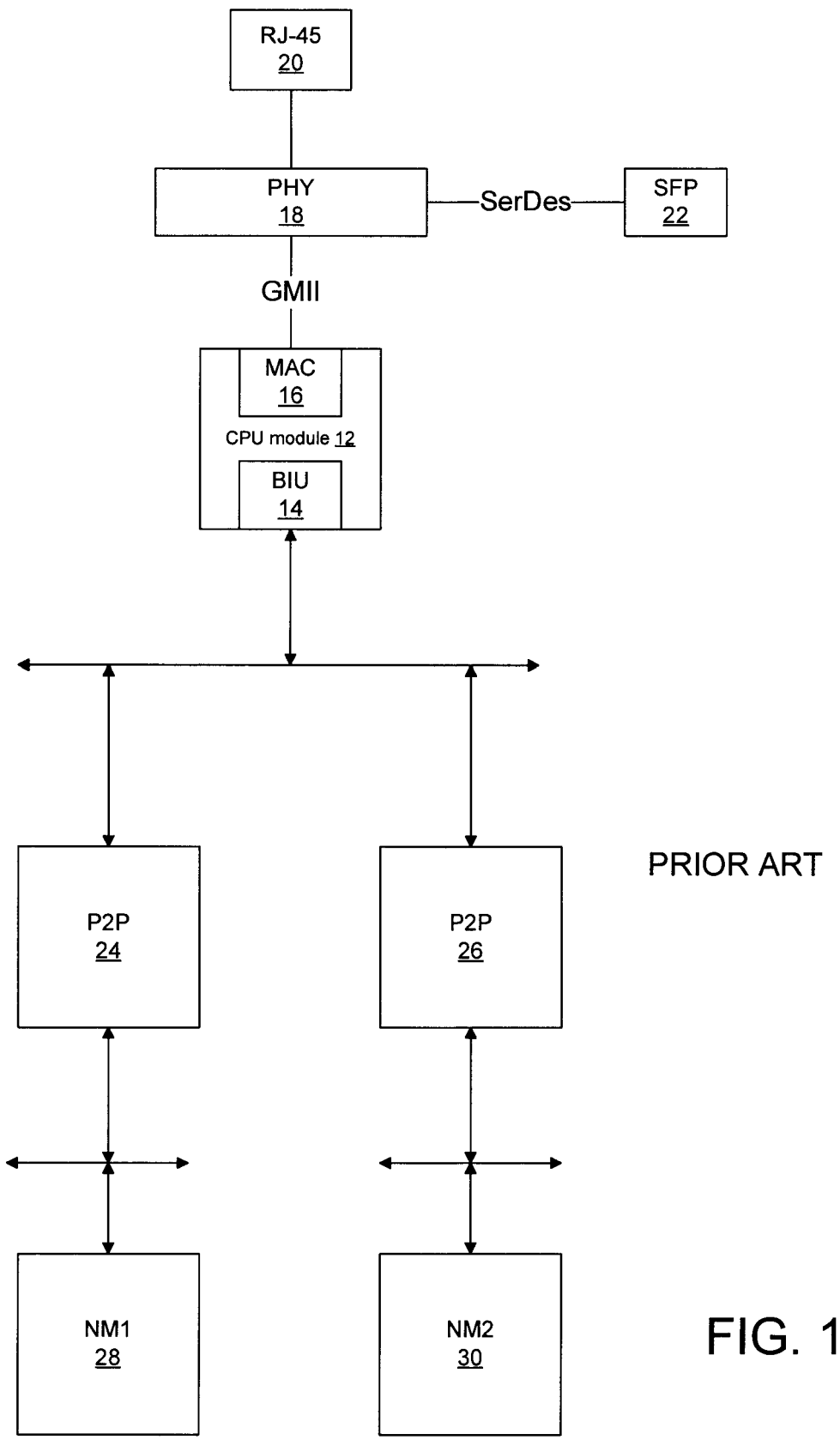
FIG. 1 is a block diagram of a router architecture.

FIG. 1 is a block diagram of a standard router configuration having a CPU 12 module including a Bus Interface Unit (BIU) 14 and a Media Access Controller 16. An Ethernet transceiver (PHY) 18 has a first interface coupled to an RJ-45 port 20 that supports various IEEE copper standards, a GMII/MII (Gigabit Media Independent Interface/Media Interface) coupled to the MAC, integrated into a CPU module, and a high speed differential serial interface connected to optical fiber modules such as an SFP (Small Form-factor Pluggable) module 22. The PHY includes a SerDes (Serializer/Deserializer) for converting between data in a parallel format transferred on the GMII/MII and data in a serial format transferred on the optical interface.

The BIU 14 is coupled to a hierarchical bus structure, in this example a PCI bus including first and second P2P bridges coupled to first and second bus segments and the parallel interfaces of first and second Network Modules are coupled to the first and second bus segments.

Accordingly, as described above, direct communication between the first and second Network Modules 28 and 30 includes the latency caused by the necessity of passing through the first and second P2P bridges 24 and 26 and the possibility that various bus segments may be busy. Communication with the CPU module has high latency for the same reasons.

Figure 2:
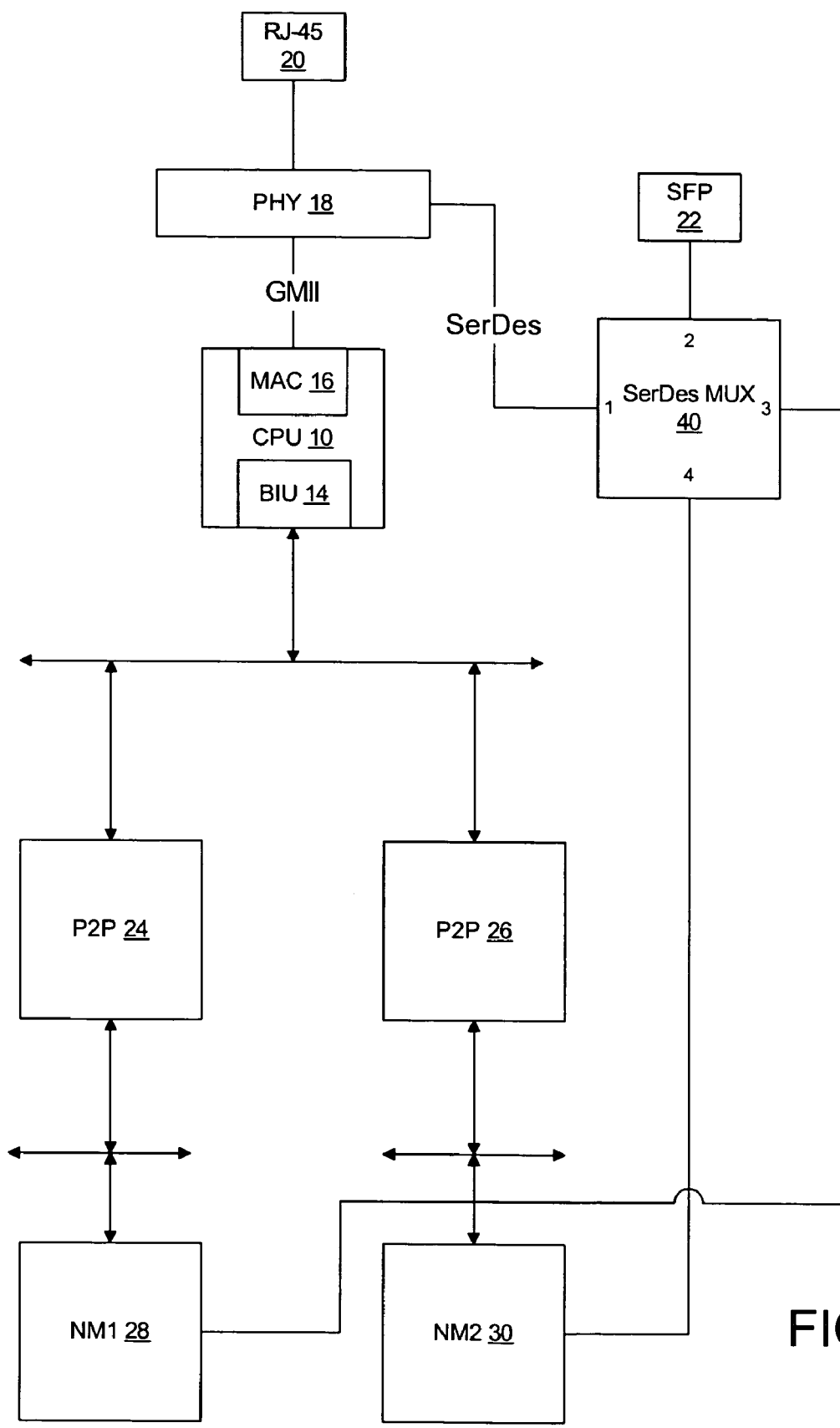
FIG. 2 is a block diagram of an embodiment of the invention.

FIG. 2 is a high-level block diagram of an embodiment of the invention which includes a SerDes Multiplexer (MUX) 40 having first, second, third, and fourth ports. The first port is coupled to the high-speed differential serial interface of the PHY 18, the second port is coupled to a high-speed differential serial interface of the SFP slot 22, the third port is coupled to a high-speed differential serial interface of the first Network Module 28, and the fourth port is coupled to high-speed differential serial interface of the second Network Module 30.

Figure 3:
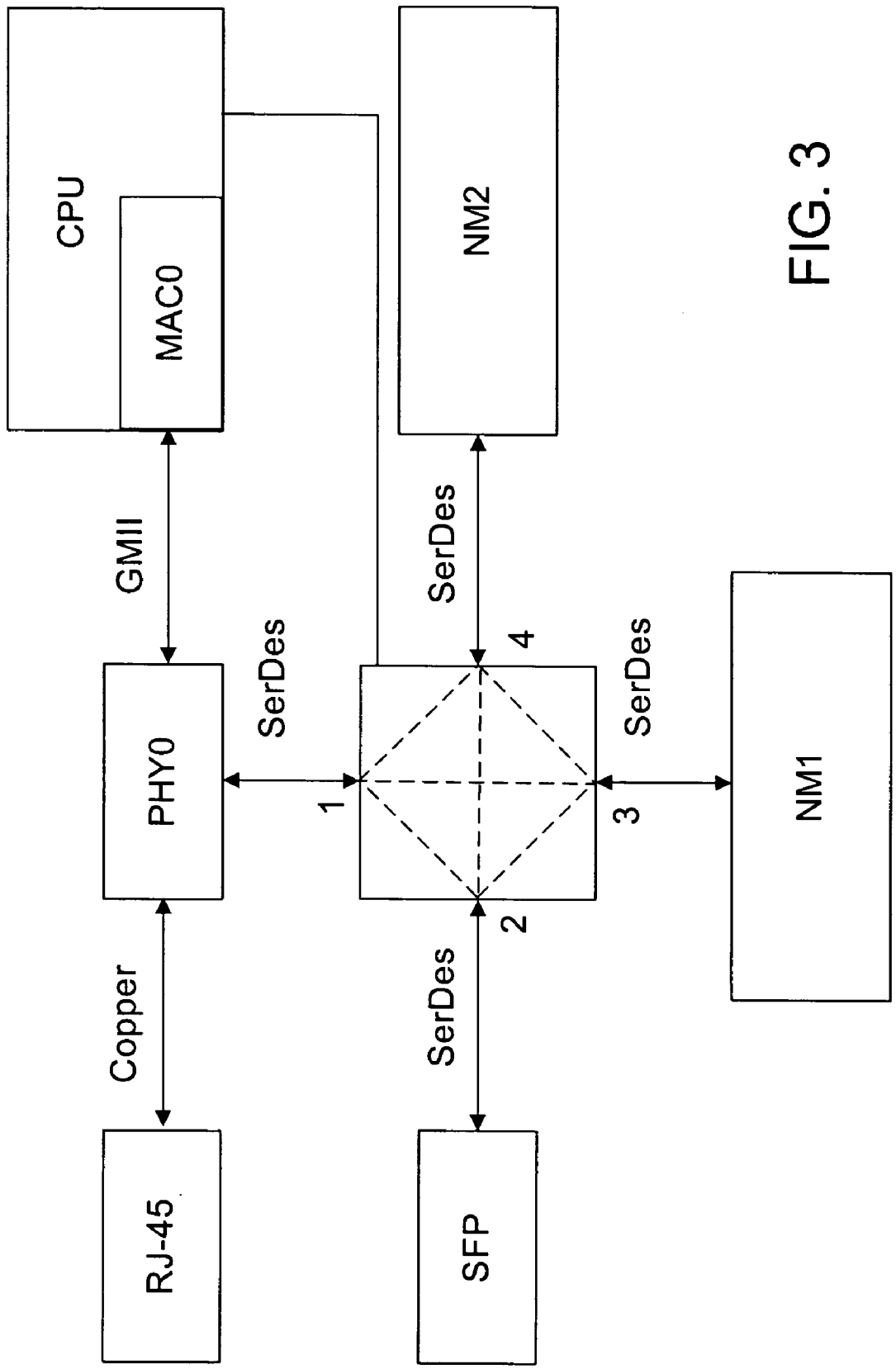
FIG. 3 is a detailed schematic diagram of an embodiment of the invention.

A more detailed description of an embodiment will now be presented with reference to FIG. 3. In this embodiment the multiplexer switch 40 is a DS90CP04 Low Power 2.5 Gbps LVDS (Low Voltage Differential Swing) Digital Cross-Point Switch manufactured by National Semiconductor. However, as understood by persons of skill in the art, any suitable 4×4 non-blocking switch can be utilized and the particular switch is not critical to the invention. Each port (1–4) of the switch provides full duplex communication and includes an input and output terminal. Any port may be connected to any other port and additionally a port may broadcast to a plurality of other ports.

Only serial data can be transmitted switches. Network modules can be designed to perform many types of functions, however to be utilized in the muxing system being described the network modules must be able to transmit and accept serial data. Selecting serial data to be switched minimizes the number of traces on the board.

The utility of the various possible connections implemented by the switch will now be described.

In a first configuration, the first and second ports are connected to connect a GE SFP module 22 to the PHY 18 for communication between the SFP module and the CPU and the third and fourth ports are connected to provide a high-speed serial link between first and second Network Modules 28 and 30 inserted in the connected first and second network module slots.

In this first configuration a direct serial link is formed between the first and second Network Modules 28 and 30 so that the latency of the PCI bus is eliminated and low-latency communication is facilitated. This saves CPU processing time of moving data between Network Modules by transferring data through a direct serial link and bypassing CPU. Simultaneously, the CPU is communicating with the SFP module through a direct serial link.

In a second configuration, the second port is coupled to either the third or fourth ports to provide GE capability to either of the Network Modules 38 and 30 to provide a low-latency GE connection between the network and the connected Network Module.

Other configurations are also beneficial, for example, the SFP could broadcast to the PHY and both Network Modules to provide GE data over a high speed serial link. For example, a system administrator can easily bring out a duplicate of the on-board GE data through one of the Network Modules for debugging/sniffing purpose. With Network Module OIR (Online Insertion & Removal) capability, an external network analyzer can be connected to the system for traffic and link analysis without disturbing any ongoing network traffic.

Figure 4:
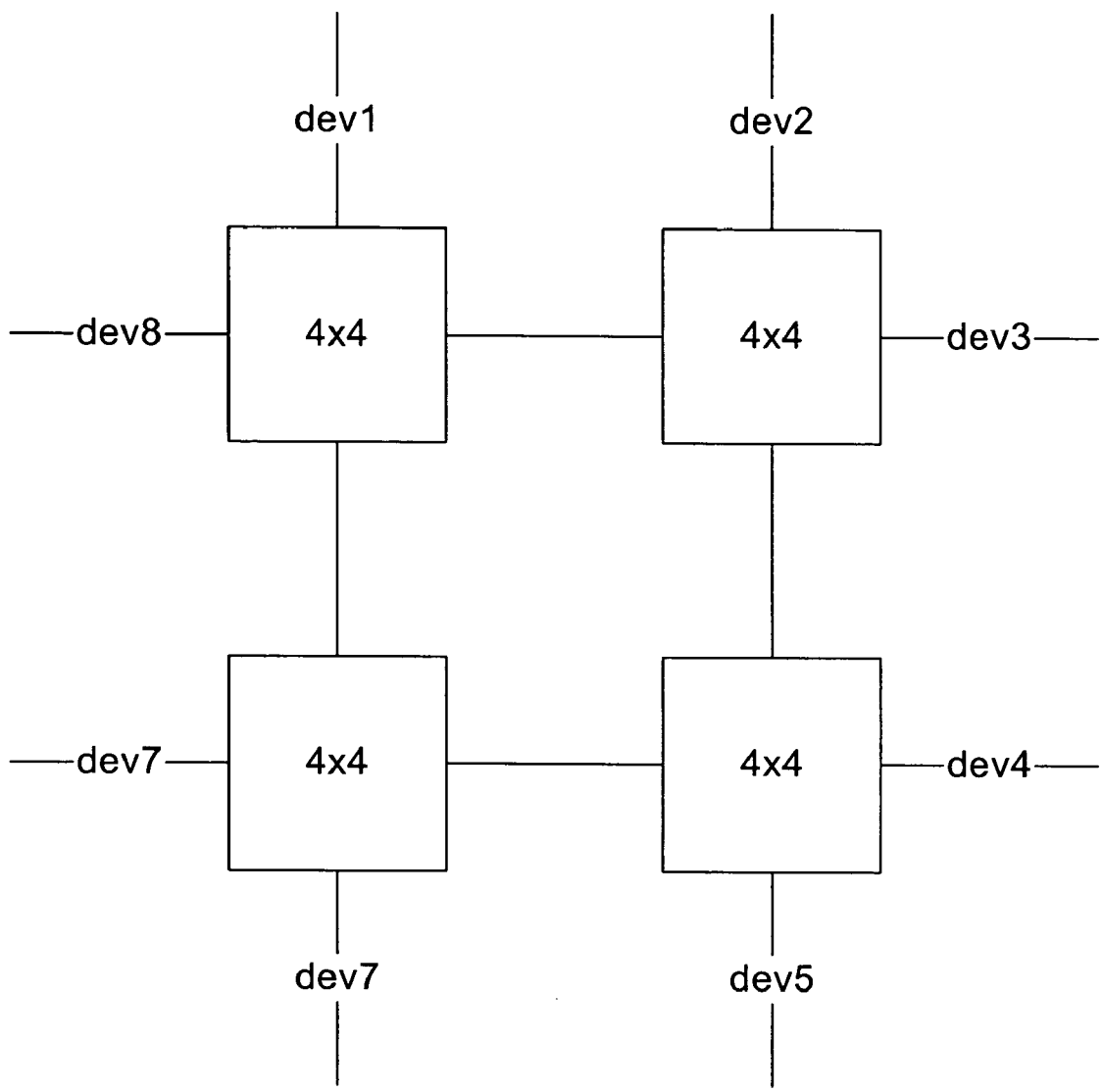
FIG. 4 is a block diagram of an embodiment coupling eight devices.

FIG. 4 depicts an embodiment having ports for non-blocking switching between eight devices. The embodiment of FIG. 4 requires four 4×4 switches and illustrates that the cost for increasing connectivity in this example is exponential and therefore requires a trade-off between cost and flexibility.

In this embodiment, the SerDes Mux can be programmed through a serial bus coupled to the CPU or through on-board FPGA. The Network Device operating system provides a user interface to allow the MUX to be configured to implement a particular router configuration.

The invention has now been described with reference to the preferred embodiments. Alternatives and substitutions will now be apparent to persons of skill in the art. For example, the particular connection scheme of the multiplexing switch to the various components are not critical to the invention. Accordingly, it is not intended to limit the invention except as provided by the appended claims.

What is claimed is:

1. A system comprising:
   a four by four non blocking switch having first, second, third, and fourth data ports, with its first data port coupled to a high-speed serial interface of a PHY, with the PHY included in a network device including a CPU and first and second network modules having parallel interfaces coupled to the CPU by a bus and with the first and second network modules having serial interfaces, with the four by four non blocking switch having its second data port coupled to a GE slot in the network device, its third data port coupled to the serial interface of the first network module, and its fourth data port coupled to the serial interface of the second network module, and also including a control port; and
   a controller having a control output coupled to the control port of the four by four switch and providing a user interface, with the controller for selectively coupling data ports in response to user input through the user interface.

2. The system of claim 1 where the GE slot is an SFP (Small Form-factor Pluggable) module slot.

3. A method for coupling components of a network device that includes a CPU module, a PHY having a high-speed serial interface, a GE slot, first and second network modules having parallel interfaces coupled to the CPU by a bus and with the first and second network modules having serial interfaces, and a four by four non blocking switch having first, second, third, and fourth data ports, with its first port coupled to the high speed-speed interface of the PHY, its second port coupled to the GE slot, its third port coupled to the serial interface of the first network module, and its fourth port coupled to the serial interface of the second network module, and the four by four switch also including a control port, said method for coupling, implemented by a controller coupled to the control port of the four by four switch, comprising:
   coupling the first and second data ports to couple the GE slot to the high-speed serial interface of the PHY to couple the GE slot to the CPU module; and
   coupling the third and fourth data ports to provide a high-speed serial link between the first and second network modules for low-latency communication.

4. A method for coupling components of a network device that includes a CPU module, a PHY having a high-speed serial interface, a GE slot, first and second network modules having parallel interfaces coupled to the CPU by a bus and with the first and second network modules having serial interfaces, and a four by four non blocking switch having first, second, third, and fourth data ports, with its first port coupled to the high-speed serial interface of the PHY, its second port coupled to the GE slot, its third port coupled to the serial interface of the first network module, and its fourth port coupled to the serial interface of the second network module, and the four by four switch also including a control port, said method for coupling, implemented by a controller coupled to the control port of the four by four switch, comprising:

coupling the second and third data ports to couple the GE slot to the first module to provide a high-speed serial link between the first module and the GE slot for low-latency communication.

5. A system for coupling components of a network device that includes a CPU module, a PHY having a high-speed serial interface, a GE slot, first and second network modules having parallel interfaces coupled to the CPU by a bus and with the first and second network modules having serial interfaces, and a four by four non blocking switch having first, second, third, and fourth data ports, with its first port coupled to the high-speed serial interface of the PHY, its second port coupled to the GE slot, its third port coupled to the serial interface of the first network module, and its fourth port coupled to the serial interface of the second network module, and the four by four switch also including a control port, said method for coupling, implemented by a controller coupled to the control port of the four by four switch, the system comprising:

means for coupling the first and second data ports to couple the GE slot to the high-speed serial interface of the PHY to couple the GE slot to the CPU module; and means for coupling the third and fourth data ports to provide a high-speed serial link between the first and second network modules for low-latency communication.

6. A system for coupling components of a network device that includes a CPU module, a PHY having a high-speed serial interface, a GE slot, first and second network modules having parallel interfaces coupled to the CPU by a bus and with the first and second network modules having serial interfaces, and a four by four non blocking switch having first, second, third, and fourth data ports, with its first port coupled to the high-speed serial interface of the PHY, its second port coupled to the GE slot, its third port coupled to the serial interface of the first network module, and its fourth port coupled to the serial interface of the second network module, and the four by four switch also including a control port, said method for coupling, implemented by a controller coupled to the control port of the four by four switch, the system comprising:

means for coupling the second and third data ports to couple the GE port to the first module to provide a high-speed serial link between the first module and the GE slot for low-latency communication.

7. A system for coupling components of a network device that includes a CPU module, a PHY having a high-speed serial interface, a GE slot, and first and second network modules having parallel interfaces coupled to the CPU by a bus and with the first and second network modules having serial interfaces, said system comprising:

an N by N non blocking switch having N ports, where N is a non-zero integer greater than or equal to four, with its first port coupled to the high-speed serial interface of the PHY, its second port coupled to the GE slot, its third port coupled to the serial interface of the first network module, and its fourth port coupled to the serial interface of the second network module, and also including a control port; and a controller having a control output coupled to the control port of the N by N switch and providing a user interface, with the controller for selectively coupling data ports in response to user input through the user interface.

* * * * *